Figure 1:
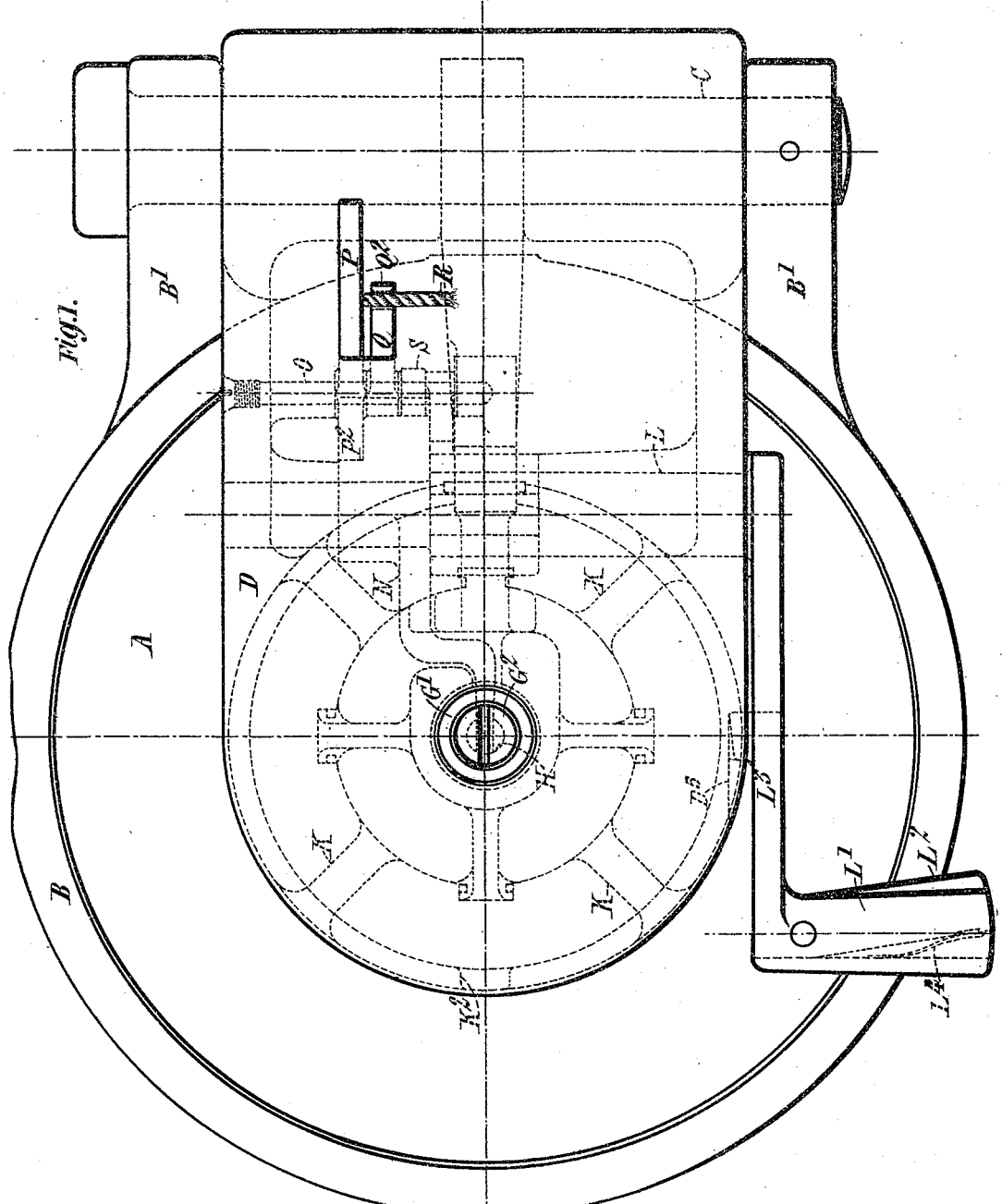

(No Model.) 10 Sheets—Sheet 1.

H. S. MAXIM & L. SILVERMAN.
BREECH LOADING ORDNANCE.

No. 548,649. Patented Oct. 29, 1895.

Witnesses:
Raphaël Netter
Jessie B. Kay

Inventors
Hiram S. Maxim
& Louis Silverman
by Duncan & Page
Attorneys.

(No Model.) 10 Sheets—Sheet 2.
H. S. MAXIM & L. SILVERMAN.
BREECH LOADING ORDNANCE.

No. 548,649. Patented Oct. 29, 1895.

Witnesses:
Raphaël Netter
Jessie B Kay

Inventors
Hiram S. Maxim
& Louis Silverman
by Duncan & Page
Attorneys (No Model.) 10 Sheets—Sheet 3.

H. S. MAXIM & L. SILVERMAN.
BREECH LOADING ORDNANCE.

No. 548,649. Patented Oct. 29, 1895.

Witnesses:
Raphael Netter
Jessie B. Kay

Inventors
Hiram S. Maxim
& Louis Silverman
by Duncan & Page
Attorneys

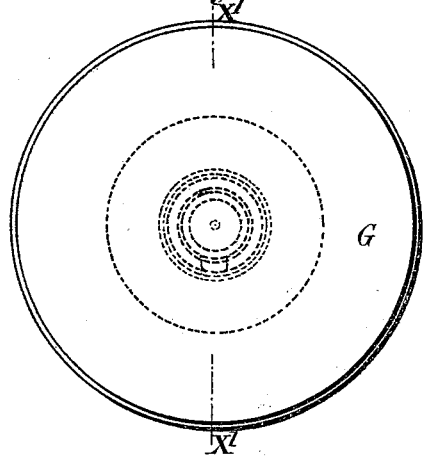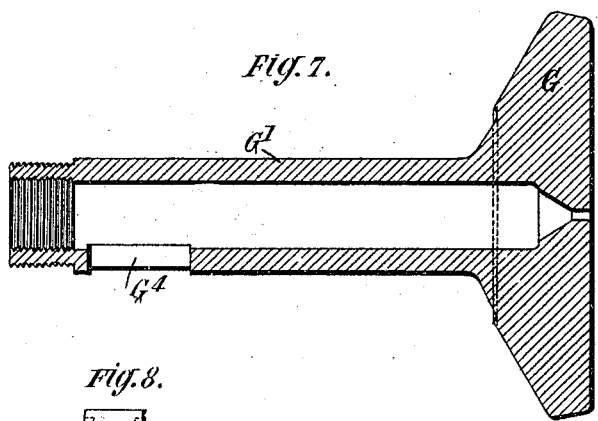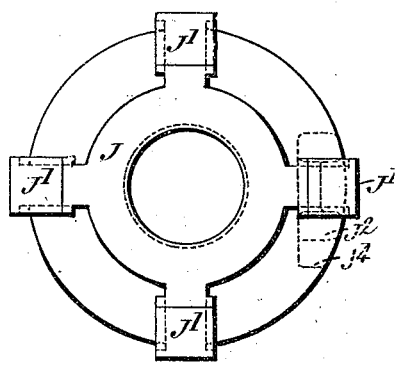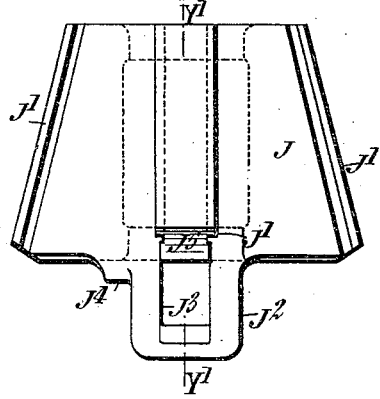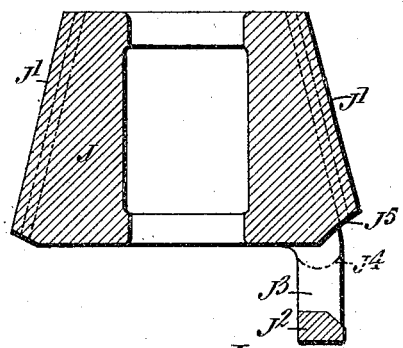

(No Model.) 10 Sheets—Sheet 5.

H. S. MAXIM & L. SILVERMAN.
BREECH LOADING ORDNANCE.

No. 548,649. Patented Oct. 29, 1895.

Witnesses:
Raphaël Netter
Jessie B. Kay

Inventors
Hiram S. Maxim
& Louis Silverman
by Duncan & Page
Attorneys

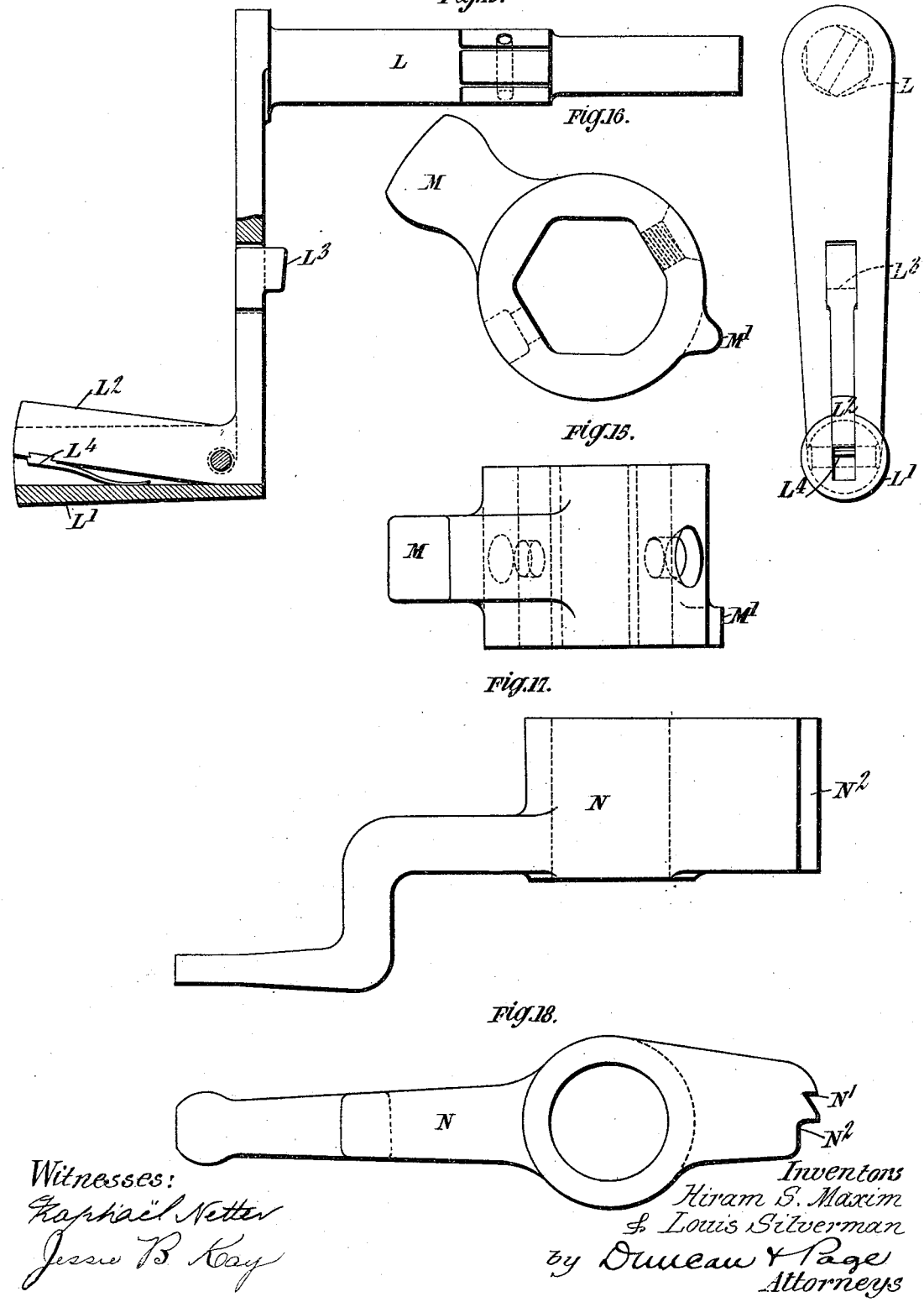

(No Model.)

10 Sheets—Sheet 7.

H. S. MAXIM & L. SILVERMAN.
BREECH LOADING ORDNANCE.

No. 548,649. Patented Oct. 29, 1895.

Witnesses:
Raphaël Netter
Jessie B. Kay

Inventors.
Hiram S. Maxim
& Louis Silverman
by Duncan & Page
Attorneys

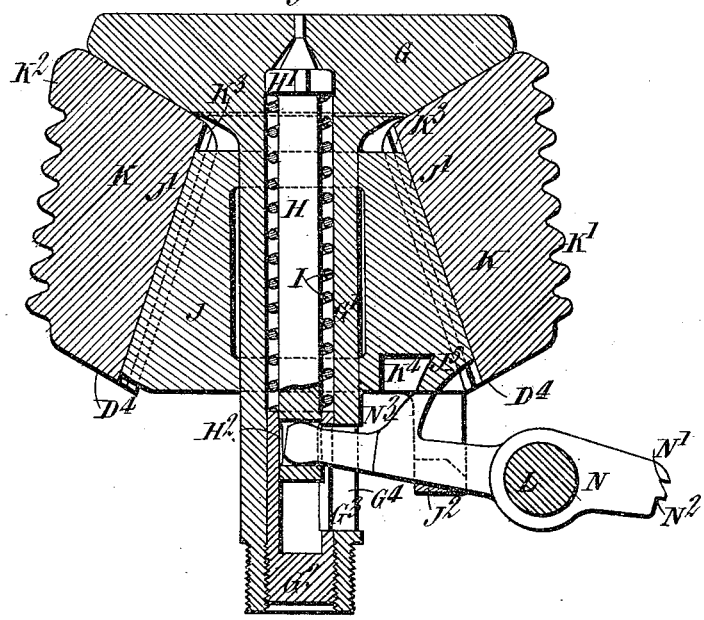

(No Model.) 10 Sheets—Sheet 9.
H. S. MAXIM & L. SILVERMAN.
BREECH LOADING ORDNANCE.
No. 548,649. Patented Oct. 29, 1895.
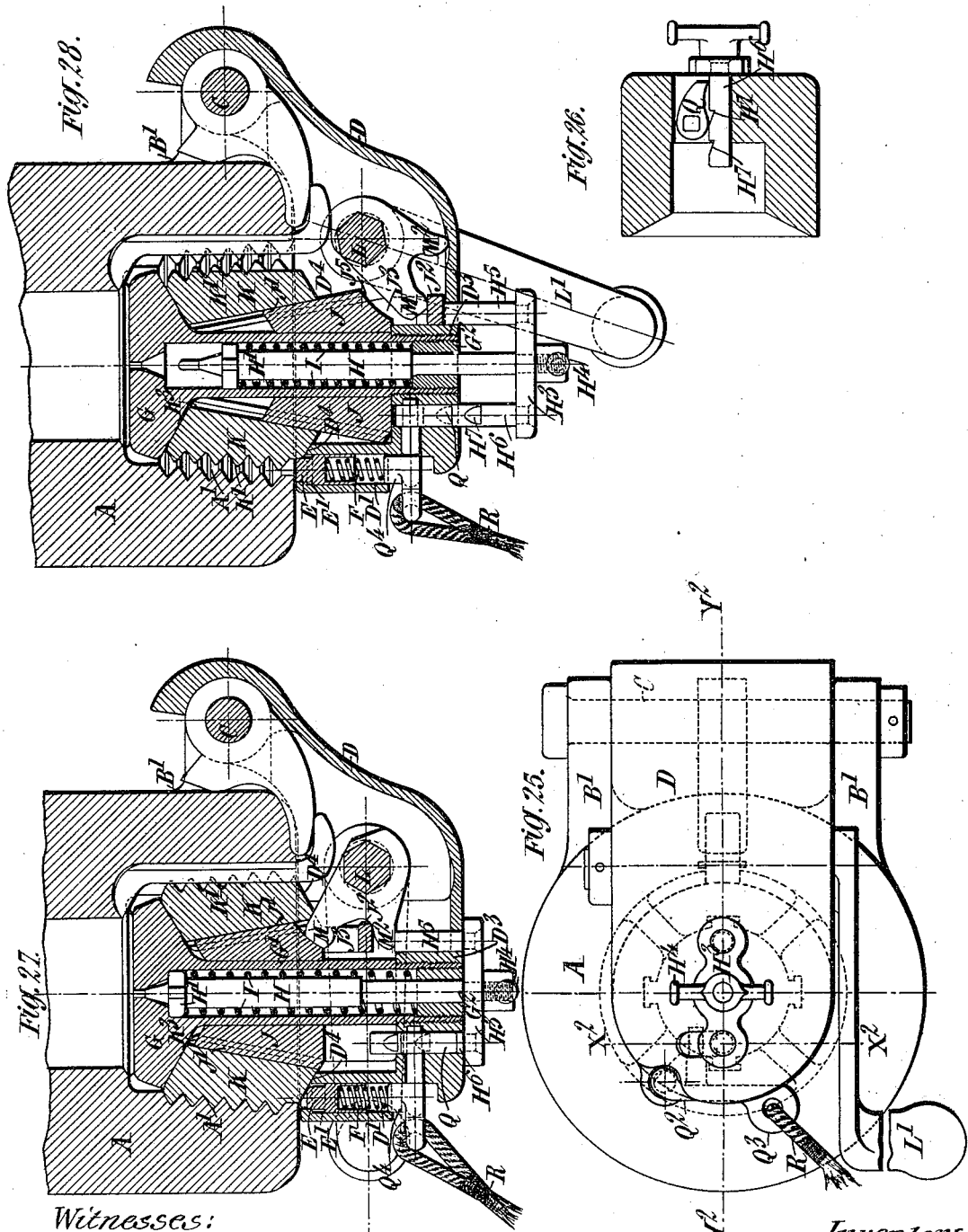
Witnesses:
Raphael Netter
Jessie B. Kay
Inventors
Hiram S. Maxim
& Louis Silverman
by Duncan & Page
Attorneys.

(No Model.) 10 Sheets—Sheet 10.

H. S. MAXIM & L. SILVERMAN.
BREECH LOADING ORDNANCE.

No. 548,649. Patented Oct. 29, 1895.

Witnesses:
Raphael Netter
Jesse B. Kay

Inventors
Hiram S. Maxim
& Louis Silverman
by Duncan & Page
Attorneys.

THE NORRIS PETERS CO., PHOTO-LITHO., WASHINGTON, D. C.

UNITED STATES PATENT OFFICE.

HIRAM STEVENS MAXIM, OF BEXLEY, AND LOUIS SILVERMAN, OF CRAYFORD, ASSIGNORS TO THE MAXIM-NORDENFELT GUNS AND AMMUNITION COMPANY, LIMITED, OF LONDON, ENGLAND.

BREECH-LOADING ORDNANCE.

SPECIFICATION forming part of Letters Patent No. 548,649, dated October 29, 1895.

Application filed December 22, 1893. Serial No. 494,413. (No model.) Patented in England January 28, 1891, No. 1,582; in France November 27, 1893, No. 234,353; in Belgium November 27, 1893, No. 107,369; in Germany November 27, 1893, No. 78,762; in Austria November 28, 1893, No. 44/4,497; in Italy XXVIII, 35,279, and LXIX, 227; in Spain February 3, 1894, No. 15,248.

*To all whom it may concern:*

Be it known that we, HIRAM STEVENS MAXIM, mechanical engineer, a citizen of the United States, residing at Bexley, and LOUIS SILVERMAN, engineer, a subject of the Queen of Great Britain, residing at Crayford, Kent, England, have invented certain new and useful Improvements in and Relating to Breech-Loading Ordnance, of which the following is a specification, reference being had to the accompanying drawings.

The invention subject of this application has been patented in foreign countries as follows: in France, No. 234,353, dated November 27, 1893; in Belgium, No. 107,369, dated November 27, 1893; in Italy, XXVIII, 35,279, and LXIX, 227; in Spain, No. 15,248, dated February 3, 1894; in Germany, No. 78,762, dated November 27, 1893; in Austria, No. 44/4,497, dated November 28, 1893, and in part in Great Britain, No. 1,582, dated January 28, 1891.

This invention relates to breech-loading ordnance of the kind wherein an expansible breech-block is employed—that is to say, a breech-block in which, for example, a head or "mushroom" is used in combination with adjustable sections operated in such a manner that the sectional part of the said block when in the breech may be expanded or contracted to move the sections into or out of engagement therewith.

The object of the present invention is to improve certain features of such breech apparatus in order that the working of the weapons to which it is applied may be rendered easier, safer, and more certain than heretofore.

According to this invention we provide improved means for preventing the expansion of the breech-block while it is out of the breech or while moving into or out of the same, and also improved means for preventing the expansion of the breech-block by mischance into engagement with the breech before it is properly home therein.

Further, our invention comprises improved means for cocking the firing-pin by hand, improvements in the cocking and firing devices, and other improvements concerning details of the breech and breech mechanism.

In order that our said invention may be clearly understood, we will now proceed to describe the same with reference to the accompanying drawings, wherein—

Figure 2:
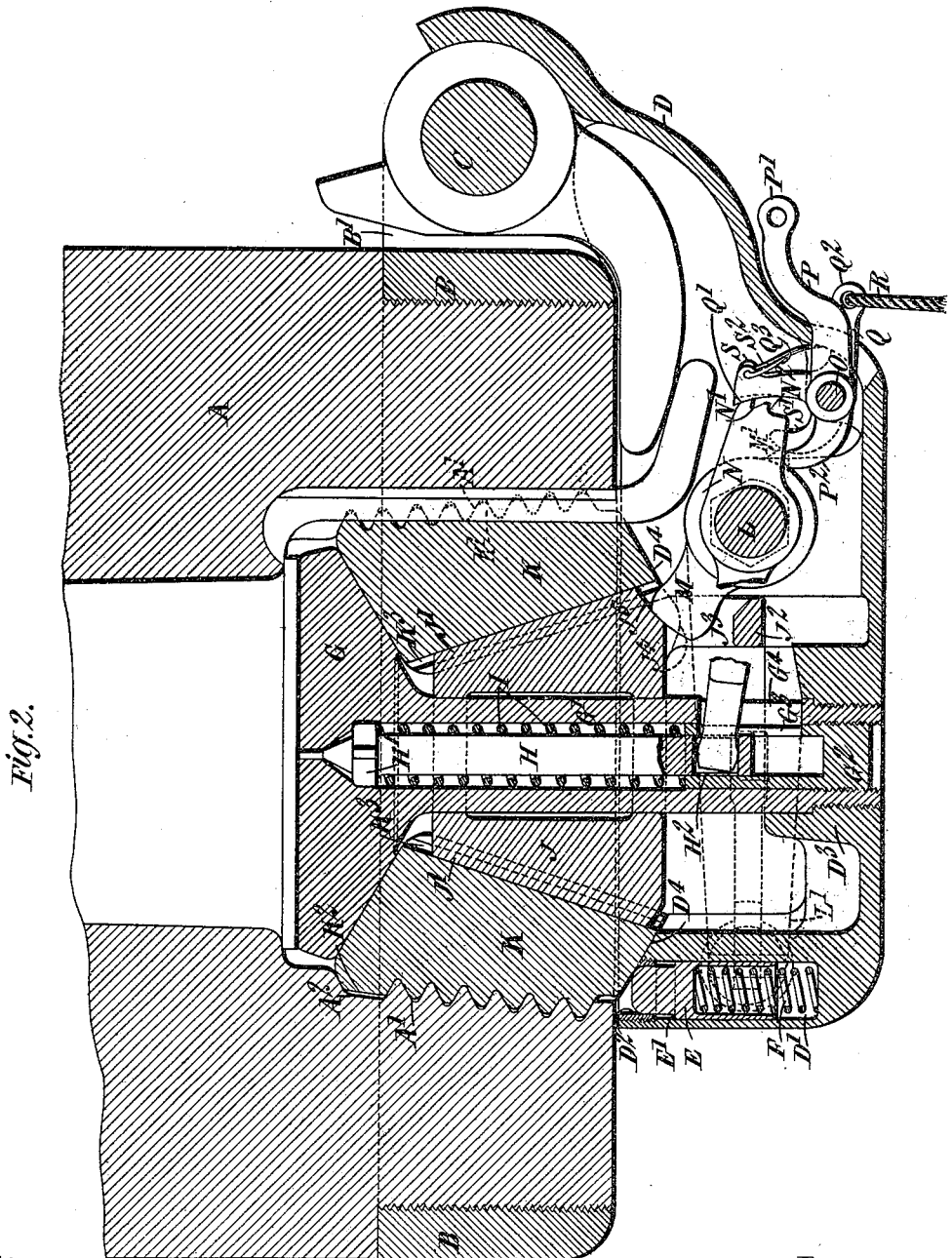
Figure 4:
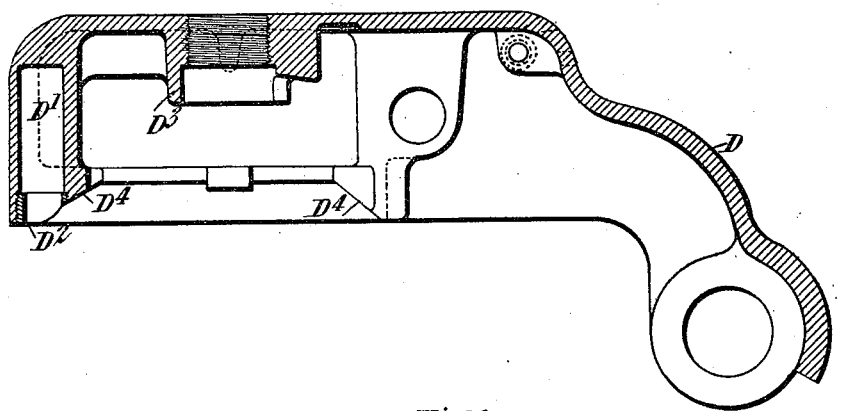
Figure 3:
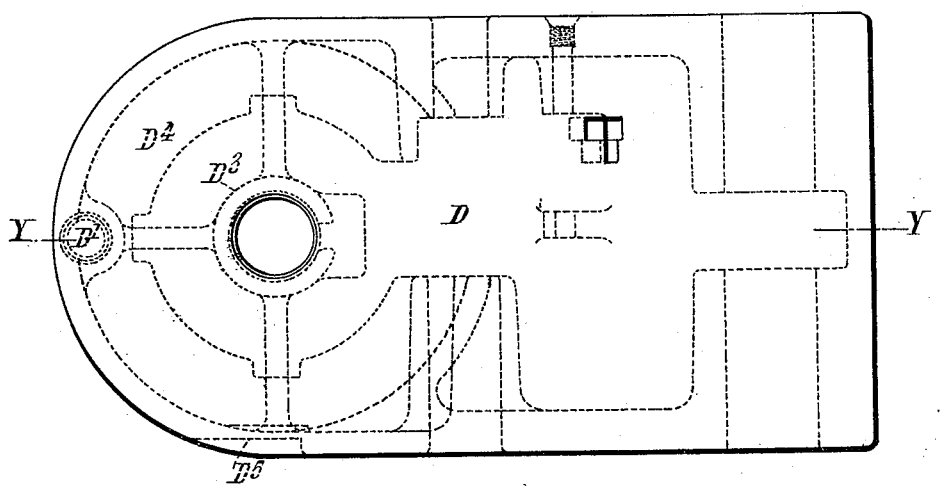
Figure 5:
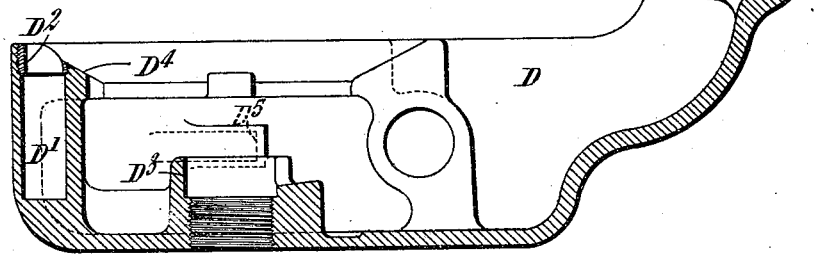
Figure 12:
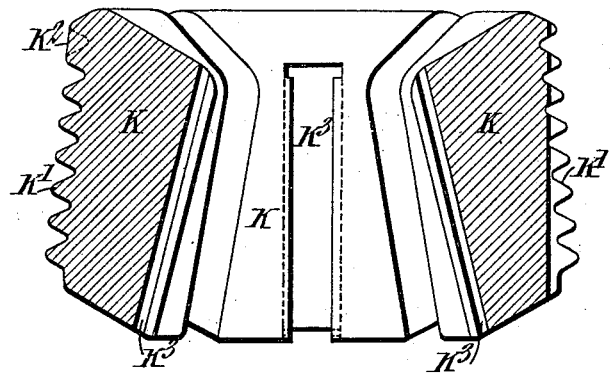
Figure 11:
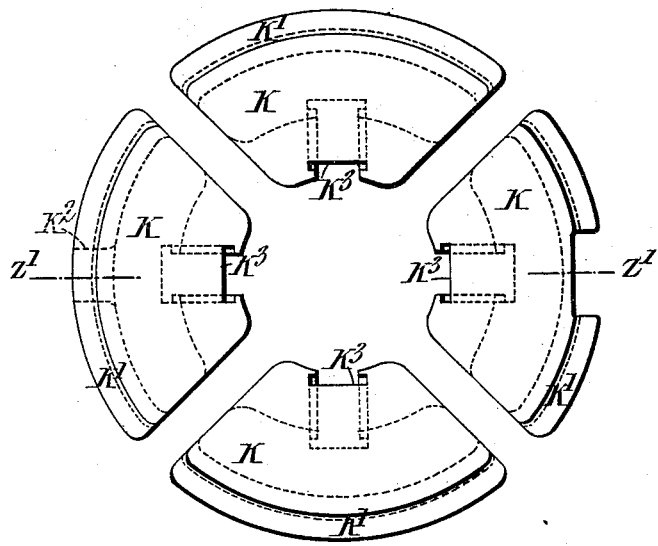
Figure 22:
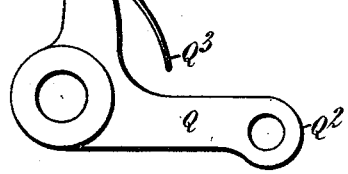
Figure 23:
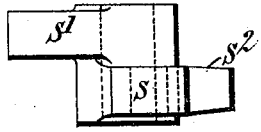
Figure 24:
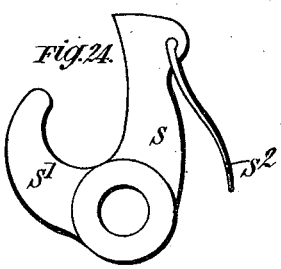
Figure 29:
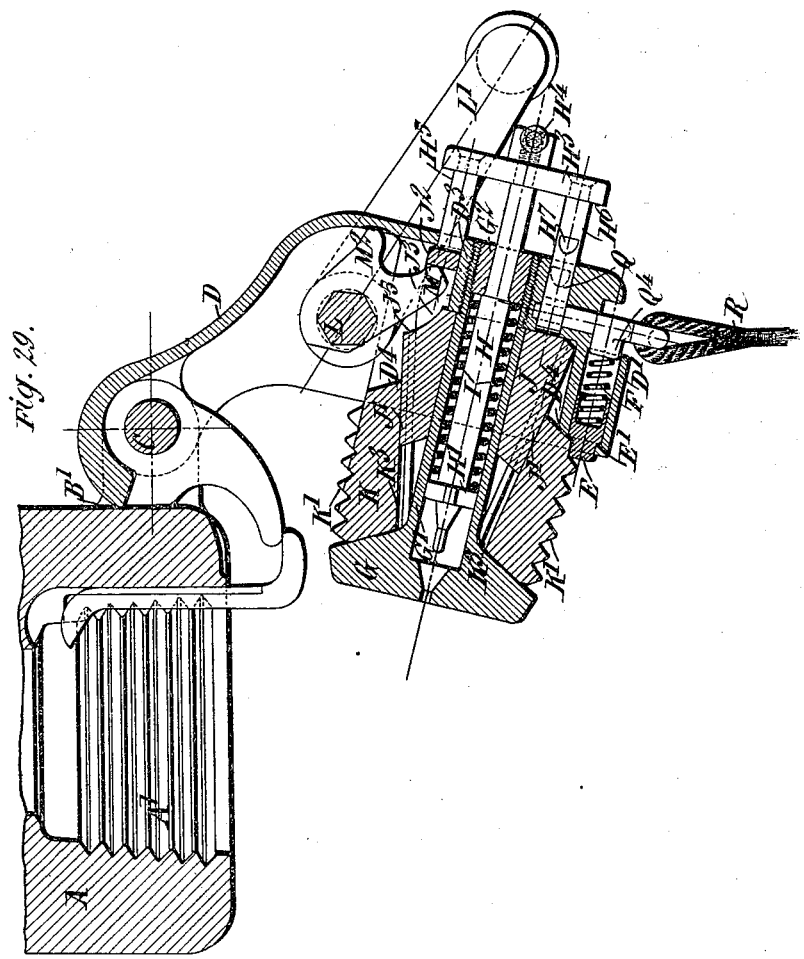

Figure 1 is a rear elevation of a quick-firing gun fitted with our improved breech mechanism. Fig. 2 is a longitudinal central section on the line X X of Fig. 1. Fig. 3 is a rear elevation of the carrier removed from the gun illustrated in Figs. 1 and 2. Figs. 4 and 5 are plans, in section on the line Y Y of Fig. 3, of the top and bottom halves, respectively, of the said carrier. Fig. 6 is an end elevation of the mushroom carried by the aforesaid carrier. Fig. 7 is a longitudinal central section of the mushroom on the line X' X' of Fig. 6. Figs. 8 and 9 are front and side elevations, respectively, of a sliding cone forming part of the breech mechanism and adapted to slide upon the stem of the mushroom. Fig. 10 is a longitudinal central section of the cone on the line Y' Y' of Fig. 9. Fig. 11 is a rear elevation of a group of sections which are adapted to slide upon the cone. The said sections are shown in this figure in the positions they occupy relatively to each other when in place upon the cone. Fig. 12 is a longitudinal central section of the group of sections on the line Z' Z' of Fig. 11. Figs. 13 to 24 are hereinafter particularly referred to. They illustrate details of the mechanism of the breech shown in Figs. 1 and 2. Fig. 24$^a$ is a view of certain parts of Fig. 2 with two of the details of the latter modified. Fig. 25 is a rear elevation of a smaller gun also fitted with our improved breech mechanism. Fig. 26 is a section through the carrier of the smaller gun on the line X$^2$ X$^2$ of Fig. 25. Fig. 27 is a longitudinal central section on the line Y$^2$ Y$^2$ of Fig. 25, showing the breech closed and the breech-block engaged therewith. Fig. 28 is similar to Fig. 27, but with the sections of the breech-block disengaged from the breech, so that the breech-block is ready for withdrawal. In this figure the firing-pin is fully cocked. Fig. 29 is similar to Fig. 28, except that the breech is shown fully open.

Like letters indicate corresponding parts throughout the drawings.

We will first describe the larger and next the smaller gun.

A is the breech of the gun. A' A' are threads formed therein. B is a ring screwed to the breech and provided with lugs B'. C is a spindle secured in the said lugs. D is a carrier adapted to turn about the said spindle.

A hole D' is provided in the carrier D to receive a hollow bolt E, which is adapted to slide therein and to operate automatically, in the manner hereinafter described, to prevent, when desired, the expansion of the breech-block. The said bolt has a shoulder E' thereon and its outward travel is limited by a bush $D^2$, screwed into the outer end of the hole in the path of the shoulder E'.

F is a spring placed at the rear of the bolt, as shown, and tending always to keep it at the outward extreme of its travel, at which it protrudes beyond the front face of the carrier. The bolt is so situated, however, that while the opposed faces of the breech and carrier are in contact its protrusion is prevented by the face of the breech or by part of the breech-block, as in Fig. 2.

G is a mushroom, the stem G' of which is screwed into an internal boss $D^3$, formed in the carrier D, as shown. The said stem, which is hollow, contains the firing-pin H, which can be moved therein in the direction of its length. The firing-pin is provided at its forward end with a shoulder H'. A spring I is placed between the shoulder and a screw-plug $G^2$, which closes the rear end of the stem G'. The firing-pin is slotted at $H^2$, the plug at $G^3$, and the stem at $G^4$, as shown.

J is a cone adapted to slide upon the stem of the mushroom.

J' J' are flanged ribs upon the cone, provided for a purpose hereinafter specified.

$J^2$ is an extension upon the cone, slotted at $J^3$ to receive the end of a cocking-lever hereinafter referred to.

$J^4$ is a projection upon the rear face of the cone, and $J^5$ is a curved surface formed at the edge of that face just above the slot $J^3$.

K K are adjustable sections forming part of the breech-block and provided upon their peripheries with threads K' to engage with the aforesaid threads A' in the breech.

The threads A' and K' are circular and continuous upon the breech and upon the sections, except that upon one of the sections an interruption is caused by the presence of a projection $K^2$ of such dimensions that it cannot enter between or interlock with the threads A' in the breech, and in the breech we provide at $A^2$ a suitable recess, which interrupts the continuity of the breech-threads and is so situated that the projection $K^2$ is only opposite the said recess $A^2$ when the breech-block is quite home. The projection and recess co-operate, in a manner hereinafter explained, to prevent the full expansion of the breech-block until it is properly home. We may substitute therefor any equivalent devices operating on a like principle. In substitution for the threads shown in the breech and on the sections we may provide one, two, or a larger number of other threads or of fillets or abutments of any suitable shape in cross-section.

A suitable clearance is left, as exemplified in Fig. 2, between the top of the threads, fillets, or abutments on the sections and the bottom of those in the breech, so that the presence of dirt between them will not cause a jam.

To facilitate the withdrawal of the breech-block, which moves into or out of the breech in a circular arc, we taper the aforesaid sections K of the block and we taper the threaded part of the breech with which they engage, as shown.

The sections K are each provided with a groove $K^3$ of approximately the same cross-section as that of the ribs J' on the cone. Each groove receives one of the said ribs. The said sections, which are adapted to move inward radially from the position in which they are shown in Fig. 2, are retained in engagement with the cone J by the employment of the said ribs and grooves, and are guided during their radial movement between the inclined rear surface of the head or mushroom G and the correspondingly-inclined face of an annulus $D^4$, formed in the carrier D.

L is a shaft pivoted vertically in the carrier D, with a handle L' at its lower end. In the handle a spring-controlled lever $L^2$ is pivoted, one end of which forms a spring-grip. The other end has upon it a projection $L^3$, which when the handle is not gripped is maintained by the action of the spring $L^4$ in engagement with a recess $D^5$ in the under side of the carrier. One part of the shaft L is approximately hexagonal and receives an arm M, the boss of which has a bore shaped to fit the approximately-hexagonal part of the shaft, so that it will turn with but not around the shaft. The said boss is provided with a projection M' to operate a safety-sear. The end of the arm M is curved to a radius measured from the center of the shaft L, so that it can fit close against the curved seating $J^5$, of similar radius, on the cone.

N is a cocking-lever placed on the shaft L, on which it turns freely just above the arm M. One end of the cocking-lever is provided with notches N' $N^2$, with which automatic and non-automatic sears engage. The other end lies in the same plane as the projection $J^4$ on the cone and is extended through the slot $G^4$ in the stem G' of the mushroom G, and the slot $G^3$ and its plug $G^2$ into the slot $H^2$ in the firing-pin H to engage with the latter.

O is a pin screwed into the carrier to serve as a pivot in the interior thereof for a lever P, one end of which passes through the carrier to the exterior, where it is provided with an eye P' to receive a lanyard. At the other end of the said lever is a curved arm P² to bear against the cocking-lever N. The combination of the cocking-lever N and the lever P constitutes one of two devices herein described, by way of example, for enabling the firing-pin to be cocked by hand, whether the breech is shut or open.

Pivoted on the pin O at a point below the lever P is a lever Q, one end Q' of which is formed as a sear to engage with the notches N' N² of the cocking-lever N. The other end is provided with an eye Q² and has a lanyard R attached thereto. This device is operated non-automatically when the release of the firing-pin is desired.

Below the sear Q an automatic sear S is pivoted. This, also, is on the pin O and is adapted to engage with the notches N' N² of the cocking-lever N. It is provided with a finger S', adapted to be operated by the aforesaid projection M' on the boss of the arm M.

The sears Q and S are pressed toward the cocking-lever N by springs Q³ and S², carried by the sears and bearing against the inside of the carrier.

The extracting devices are of a well-known type and therefore are not further referred to herein.

Figure 20:
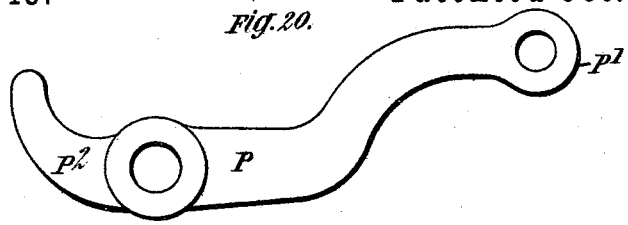
Figure 19:
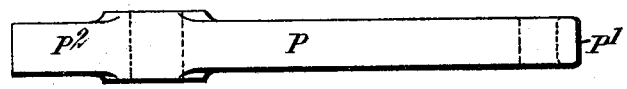
Figure 21:
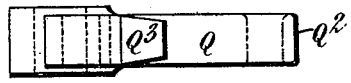

Figs. 13 and 14 are views at right angles to each other of the shaft L, with its handle L'. Figs. 15 and 16 show the arm M in elevation and plan, respectively. Figs. 17 and 18 show the cocking-lever N in elevation and plan, respectively. Figs. 19 and 20 show the lever P in elevation and plan, respectively. Figs. 21 and 22 show the sear Q in elevation and plan, respectively. Figs. 23 and 24 show the automatic sear S in elevation and plan, respectively.

We will now describe the operation of this gun, assuming that the parts thereof are in the positions in which they are indicated in Figs. 1 and 2. To open the breech and cock the firing-pin the handle L' is gripped and thereby the projection L³ acts to release it from the carrier D. Next the handle is pulled outward from the breech, thus turning the shaft L and causing it to move the arm M clear of the curved surface J⁵ of the cone J, unlocking the same. The arm M is moved on into contact with the metal at the rear end of the slot J³ in the extension J², and then by a continuation of its movement draws the cone J along the stem G' to the rear. In the rearward movement of the cone J the sections K are drawn inward radially from the threads A' of the breech, and the projection J⁴ on the cone turns the cocking-lever N on its pivot L and cocks the firing-pin H. The cocking-lever, and with it the firing-pin, is held in the half-cocked or in the full-cocked position by the sears Q and S, which engage automatically with the notches N N² as the cocking-lever turns. Instead of making the breech-block and cocking-lever independent of each other, as in the present instance, except during a portion of the movement of the block, we may arrange by suitably extending the projection J⁴, that the movements of the block and cocking-lever shall be simultaneous and of equal duration. After the contraction of the breech and the cocking of the firing-pin the outward movement of the handle L, is continued; but it now moves with and not relatively to the carrier, turning the latter about the spindle C, so that the breech-block moves with the carrier and thus opens the breech.

After the breech-block is contracted and started on its movement out of the breech by the movement of the carrier the bolt E will move out automatically by the action of the spring F into engagement with one of the sections K. The manner in which the block contracts and in which the bolt E engages one of the sections K can be clearly seen in two of the sectional plans, Figs. 28 and 29, although they relate to the smaller gun hereinafter described, for in respect of the bolt E and the breech-block and the action thereof both guns are alike. As long as this engagement continues, the block cannot be expanded, for during the time in which movement of one section is prevented movement of the cone, and therefore of the rest of the sections, is also prevented. Upon re-closing the breech by a series of operations effected in reverse order to the foregoing the bolt E comes into contact with the rear face of the breech just before the carrier and breech-block are quite home and is moved thereby, so as to disengage the sections of the latter to allow them while the block is moving farther home to lock the same in the breech.

If by accident the breech-block is expanded prior to its entry into the breech, its engagement therewith during its entry is prevented for the reason that the projection K² is not able to enter between the threads A' or fillets or abutments in the breech, and therefore will simply ride over them, preventing, until it arrives opposite the recess A² aforesaid, any further expansive movement of the sections in the breech. Moreover, in opening the breech the projection K² will again ride over the threads, fillets, or abutments of the breech if the breech-block should not have been contracted sufficiently, and will thus facilitate its further contraction. After the closing of the breech and in the return movement of the arm M to lock the breech by moving into the position in which it is shown in Fig. 2 the projection M' acts upon the finger S' of the sear S and moves it automatically out of engagement with the notches of the cocking-lever N. The sear S can be operated only by the breech-block, and unless it be thus operated the other sear Q, even if operated, will not release the firing-pin, which cannot therefore move forward to strike the cap in a cartridge until the breech is closed and locked.

To cock the firing-pin by hand, the outer end of the lever P must be pulled by a lanyard or otherwise, whereupon its inner end P² will push the cocking-lever N around upon its spindle O to cause it to cock the firing-pin. This is an important feature of our invention, for it permits the recocking of the firing-pin after a misfire, for instance, without the need of opening the breech.

The whole of the cocking and firing mechanism in the larger gun is within the carrier, and as the firing-pin does not protrude therethrough the exterior of the carrier is neat and free from projections at the rear and also at the sides, except where the levers P and Q protrude.

In the modification illustrated in Fig. 24ª an extension N³ is provided upon one side of the longer arm of the lever N to bear against the rear face of the cone J when the breech is closed, as shown. A cavity K⁴ is provided in the rear face of the cone in such a situation that the extension N³ will come opposite thereto upon the completion of the operation of cocking, which commences simultaneously with the commencement of the rearward movement of the cone and is effected by the said cone, which presses upon the extension N³ and thereby turns the lever N until the firing-pin is fully cocked, by which time the extension N³, which has moved upon the rear face of the cone during cocking, will come opposite the cavity K⁴ and will be received thereon during the further rearward movement of the cone. By this arrangement the firing-pin is cocked during the first portion of the rearward movement of the cone instead of during the last part thereof, as in the preceding example.

In the smaller type of gun illustrated by Fig. 25 to 29 the breech mechanism is in most respects similar in construction and operation to that hereinbefore described with reference to Figs. 1 to 24; but it differs therefrom in certain details, as will now be explained.

The firing-pin is extended through the rear face of the carrier D and at its outer end is provided with a cross-head H³ and a handle H⁴, so as to constitute the second of the two devices herein described for enabling the firing-pin to be cocked by hand whether the breech is shut or open.

The cross-head is provided with two extensions H⁵ and H⁶. The extension H⁶ has teeth H⁷ thereon, as shown.

The arm M, which serves, as in the larger gun, to lock the breech and also to move the cone J by action upon the extension J², has a finger M² formed thereon, which, when the firing-pin H is at the forward extreme of its travel, is in front of the extension H⁵.

Q is a pawl pivoted in the carrier D to act upon the teeth H⁷. The said pawl is secured upon the squared end of a spindle Q', which at the other end is provided with a lever Q², by which the spindle Q' can be rotated to lift the pawl Q out of engagement with the teeth H⁷. The end Q³ of the lever Q² is provided with an eye to receive a lanyard, and the other end Q⁴ is shaped to enter the cavity D' in the carrier and to bear against one end of the spring F therein, which latter operates thereon to keep the lever normally in such a position that the pawl Q is maintained in engagement with the teeth H⁷.

No spring-grip is fitted to the handle L'. During the first part of the movement of the shaft L in the opening of the breech and while the arm M is unlocking the cone J the finger M² acts upon the extension H⁵ to move the firing-pin to the rear sufficiently far for the pawl Q to engage with the teeth H⁷ on the extension H⁶, so as to hold the firing-pin at half-cock. Having thus half-cocked the firing-pin, the finger M² moves clear of the extension H⁵ and the arm M commences to act upon the extension J² of the cone and moves it to the rear. The cone acts to withdraw the sections K of the block from engagement with the threads of the breech and the cocking of the firing-pin is completed by the extension J², which in the rearward movement of the cone comes into contact with the extension H⁵ on the cross-head H³, and thereby pushes the firing-pin to the extreme of its rearward travel. The position of the parts when these operations are completed is shown clearly in Fig. 28. By pulling at the handle H⁴ the firing-pin may be pulled to the rear non-automatically at any time.

Fig. 29 shows the block and carrier swung clear of the breech. To release the firing-pin the end Q³ of the lever Q² is drawn smartly to the rear, whereby the spindle Q' is rotated and the pawl Q, turning with it, is lifted out of engagement with the teeth H⁷, whereupon the spring I pushes the firing-pin forward through the face of the mushroom G, provided that the breech is properly locked. Otherwise the end of the arm M² will occupy such a position in the path of the extension H⁵ as to prevent the firing-pin H from completing its forward movement. The said Figs. 27 to 29 show clearly the action of the bolt E, for in Fig. 27 the bolt is shown within the hole D' in the carrier, and in Fig. 28 the breech-block is shown contracted with the bolt bearing against the rear face of the breech and in partial engagement with the side of one of the sections K. This position is one into which it passes automatically immediately upon the contraction of the block. In Fig. 29 the bolt E is shown in the position it assumes immediately upon the retirement of the carrier from the breech—that is to say, in complete engagement with one of the sections K to keep the block contracted until the carrier is again brought up to the rear face of the breech.

In guns which fire loose ammunition or non-obturating cartridges the mushroom-head can be made to serve as an obturator.

What we claim is—

1. The combination of a carrier, a breech-block composed of a number of sections, means for forcing the sections of the breech-block radially outward and pulling them radially inward when required, and a spring bolt mounted on the carrier and automatically operating to engage and disengage with the sections of the breech-block, substantially as, and for the purpose, specified.

2. The combination of a carrier, an expanding breech-block composed of a number of sections, a sliding cone on which the sections of the breech-block are mounted, a spring bolt mounted on the carrier and automatically operating to engage and disengage with the sections of the breech block, and an arm mounted on the operating shaft of the breech block, adapted to engage with the rear face of the cone so as to lock the cone when the breech block is home in the breech, substantially as described.

3. The combination of a carrier hinged to the breech of a gun, a breech-block composed of a number of sections, means for forcing the sections of the breech-block radially outward to engage with the breech, and means for preventing such expansion of the block into engagement with the breech before it is properly home therein, substantially as set forth.

4. The combination of a carrier hinged to the breech of a gun, a breech block composed of a number of sections, means for forcing said sections radially outward into engagement with the breech and pulling them inward out of engagement with the breech, a firing pin mounted in the breech block, and means whereby said firing pin can be cocked from the exterior of the carrier whether the breech is open or closed, substantially as and for the purposes, specified.

5. The combination of a carrier hinged to the breech of a gun, a taper breech block provided with threads and composed of a number of sections, and means for forcing said sections radially outward into engagement with the breech and pulling them inward out of engagement with the breech, substantially as set forth.

6. The combination of a carrier hinged to the breech of a gun, a breech block supported on said carrier a spring operated firing pin contained in the breech block, a cocking lever pivoted to the carrier in operative connection with the firing pin and having notches in its end, two spring sears also pivoted to the carrier and adapted to engage in the notches in the end of said lever when the lever is turned on its pivot to cock the firing pin, and means whereby one of the sears is disengaged from the lever when but not until the breech is closed, substantially as set forth.

7. The combination of a carrier hinged to the breech of a gun, a breech block supported on said carrier, a spring operated firing pin contained in the breech block, a cocking lever pivoted to the carrier in operative connection with the firing pin and having notches in its end, two spring sears also pivoted to the carrier and adapted to engage in the notches in the end of said lever when the lever is turned on its pivot to cock the firing pin, and a pivoted lever one end of which can engage with the cocking lever the other end of said lever projecting outside the carrier so as to be operated from the exterior thereof, substantially as described.

8. The combination of a carrier hinged to the breech of a gun, a "mushroom-shaped" part secured by the end of its stem to the carrier, a cone adapted to slide to and fro on said stem, threaded breech-block sections mounted on said cone, a shaft journaled in bearings in the carrier and having an arm which engages with the cone to move the same backward and forward on the stem, and means for rotating said shaft when it is desired to open or close the breech, substantially as set forth.

9. The combination of a carrier hinged to the breech of a gun, a "mushroom-shaped" part secured by the end of its stem to the carrier, a cone having a recess in the rear end thereof adapted to slide to and fro on said stem, a spring operated firing pin contained in the stem, a cocking lever pivoted to the carrier in operative connection with the firing pin and having a projecting part which is engaged by the rear face of the cone when the breech is shut but is opposite the recess in said rear face when the firing pin is cocked and the breech is open, substantially as set forth.

10. The combination with a carrier hinged to the breech of a gun, a "mushroom-shaped" part secured by its stem to the carrier, a cone adapted to slide to and fro on said stem, threaded breech-block sections mounted on said cone one of said sections having a projecting part thereon which is adapted to be received in a recess in the breech when but not until the breech-block is home in the breech, a shaft journaled in bearings in the carrier and having an arm which engages with the cone to move the same backward and forward on the stem and thereby expand and contract the breech-block, and means for rotating said shaft when it is desired to open or close the breech, substantially as set forth.

11. The combination of a carrier D hinged to the breech of a gun, a "mushroom-shaped" part G secured by the end of its stem to the carrier, a cone J adapted to slide to and fro on said stem, threaded breech-block sections K mounted on said cone, a shaft L journaled in bearings in the carrier and having an arm M which engages with the cone J to move the same backward and forward on the stem, means for rotating said shaft when it is desired to open or close the breech, a spring operated firing pin H contained in the stem of the "mushroom," a cocking lever N for cocking said firing pin, a safety sear S adapted to automatically engage with the cocking lever when the firing pin is cocked, and a projection M' on the arm M which engages with the breech cone which projection disengages the safety sear from the cocking lever as soon as the breech is closed, substantially as set forth.

12. The combination of a carrier D hinged to the breech of a gun, a "mushroom shaped" part G secured by the end of its stem to the carrier, a cone J adapted to slide to and fro on said stem, threaded breech block sections K mounted on said cone, a spring operated firing pin H contained in the stem of the "mushroom," a shaft L journaled in bearings in the carrier and having an arm M which engages with the cone J to move the same backward and forward on the said stem, a cocking lever N loosely mounted on shaft L and in operative connection with the firing pin and having notches in its end, said cocking lever being placed in the path of the sliding cone J and being operated thereby during the rearward movement thereof to cock the firing pin, a spring safety sear S pivoted to the carrier and adapted to engage in the notches in the end of the cocking lever when said lever is turned on the shaft to cock the firing pin, and means for rotating the shaft when it is desired to open or close the breech, substantially as set forth.

In witness whereof I have hereunto set my hand this 22d day of November, 1893.

HIRAM STEVENS MAXIM.

Witnesses to signature of Hiram Stevens Maxim:
WILLIAM B. HESS,
D. N. DEMETRIADES.

In witness whereof I have hereunto set my hand this 4th day of December, 1893.

LOUIS SILVERMAN.

Witnesses to signature of Louis Silverman:
GEO. HARRISON,
F. W. LE TALL.